(12) United States Patent
Tsai et al.

(10) Patent No.: US 7,594,747 B2
(45) Date of Patent: Sep. 29, 2009

(54) DIRECT-TYPE BACKLIGHT MODULE AND LAMP HOLDER THEREOF

(75) Inventors: Chia-hsun Tsai, Hsin-Chu (TW); Yung-hsin Liu, Hsin-Chu (TW); De-chih Liu, Hsin-Chu (TW); Yung-sheng Tsai, Hsin-Chu (TW)

(73) Assignee: AU Optronics Corp., Hsin-Chu (TW)

( * ) Notice: Subject to any disclaimer, the term of this patent is extended or adjusted under 35 U.S.C. 154(b) by 0 days.

(21) Appl. No.: 11/968,757

(22) Filed: Jan. 3, 2008

(65) Prior Publication Data

US 2008/0278942 A1   Nov. 13, 2008

(30) Foreign Application Priority Data

May 9, 2007    (TW) ............................... 96116553 A (51) Int. Cl.
*F21V 7/04* (2006.01)
(52) U.S. Cl. ..................... 362/634; 362/614; 362/97.1
(58) Field of Classification Search ................... 362/33, 362/97, 217, 220, 224, 225, 227, 238, 239, 362/249, 250, 260, 396, 418, 614, 559, 561, 362/632, 633, 634; 349/58, 60, 70
See application file for complete search history.

(56) References Cited

U.S. PATENT DOCUMENTS

| 7,059,736 | B2 | 6/2006 | Yu et al. | |
|---|---|---|---|---|
| 7,070,313 | B2 | 7/2006 | Kim et al. | |
| 7,072,330 | B2 * | 7/2006 | Pounds et al. | 370/352 |
| 7,387,419 | B2 * | 6/2008 | Jeong et al. | 362/561 |
| 2005/0063170 | A1 | 3/2005 | Lee et al. | |
| 2005/0073858 | A1 | 4/2005 | Kim et al. | |
| 2005/0270803 | A1 * | 12/2005 | Tsai et al. | 362/632 |
| 2006/0007707 | A1 | 1/2006 | Lee et al. | |
| 2006/0023472 | A1 | 2/2006 | Liu et al. | |
| 2006/0034090 | A1 | 2/2006 | Chen et al. | |
| 2006/0104083 | A1 * | 5/2006 | Kwon | 362/559 |
| 2006/0268542 | A1 | 11/2006 | Chen et al. | |
| 2008/0012498 | A1 * | 1/2008 | Takata | 313/607 |

FOREIGN PATENT DOCUMENTS

| TW | 251075 | 11/2004 |
|---|---|---|
| TW | 251149 | 11/2004 |
| TW | 255952 | 1/2005 |
| TW | 265536 | 5/2005 |
| TW | 246575 | 1/2006 |
| TW | 255895 | 6/2006 |
| TW | 256991 | 6/2006 |
| TW | 297436 | 9/2006 |

* cited by examiner

*Primary Examiner*—Hargobind S Sawhney
(74) *Attorney, Agent, or Firm*—Kirton & McConkie; Evan R. Witt (57) ABSTRACT

A direct-type backlight module and a lamp holder thereof are disclosed. The lamp holder includes a plurality of lamp seats, and a plurality of connecting arms each connected with at least one adjacent lamp seat. Each lamp seat has a retaining portion for retaining a corresponding lamp therein. Each connecting arm has a bendable portion that can be bent along a horizontal direction so as to adjust a distance between adjacent lamp seats. Therefore, the lamp holder of the present invention has a capability to retain several lamp groups spaced at different intervals for different LCD types or with lamp assembly tolerances, and thereby achieves a higher convenience in the LCD assembly.

11 Claims, 8 Drawing Sheets

DIRECT-TYPE BACKLIGHT MODULE AND LAMP HOLDER THEREOF

BACKGROUND OF THE INVENTION

1. Field of the Invention

The present invention relates to a backlight module and a lamp holder thereof, and particularly to a direct-type backlight module and a lamp holder thereof for convenience on assembly of lamps spaced at different intervals.

2. Description of Prior Art

In recent years, LCDs (Liquid Crystal Displays) gradually replaces the conventional CRT (Cathode-Ray Tube) displays to be a mainstream product in the display market because of its high compactness, high luminance, lower-power consumption and radiation-free advantages.

However, since the liquid crystal molecules spread in an LCD display panel have not a luminance property, a backlight module is utilized to serve as a plane light source that is essential for the display panel to realize image display. Thus, the backlight module has become an indispensable key component in the LCD device.

In general, the backlight modules may be classified into an edge type and a direct type according to different position where the lamp is disposed in the module. The edge-type backlight module allocates a lamp on the lateral side of the display panel and therefore is suitable for an thin-shaped display panel with a small size. In contrast, the direct-type backlight module allocates multiple lamps on a bottom of the display panel, and therefore is suitable for a large-size display panel. The direct-type backlight module generally includes a base plate, a plurality of lamps fixedly arranged on the base plate, and a diffusion plate located above both the base plate and the lamps and thereby outwardly diffusing the lights emitted from the lamps along a vertical direction with regard to the diffusion plate so as to provide the LCD display panel with a plane light source.

Figure 1:
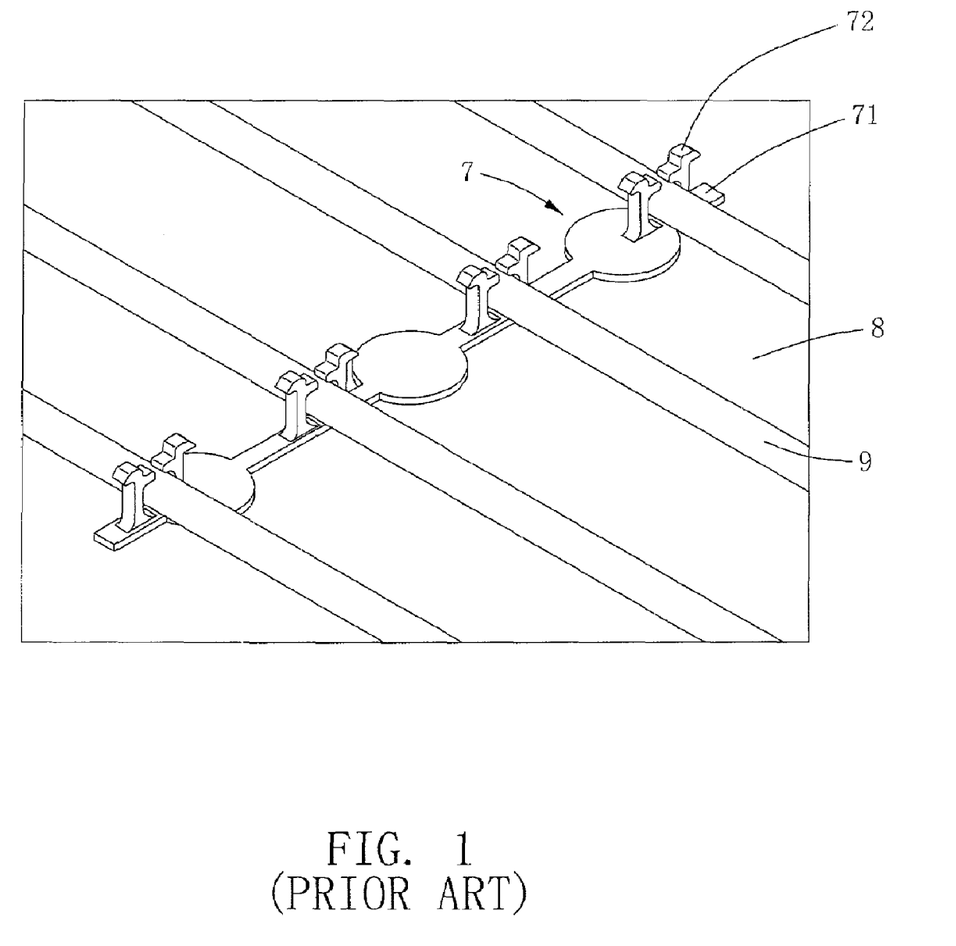
FIG. 1 illustrates a conventional lamp holder for a direct-type backlight module.

Nevertheless, to firmly retain the lamps on the base plate, a lamp holder is often needed for the direct-type backlight module. As shown in FIG. 1, a conventional lamp holder 7 includes a base portion 71 is fixed over a base plate 8 and a plurality pair of clips 72 upwardly projecting from the base portion 71. Each pair of clips 72 is spaced at a predetermined interval to contribute a resilient strength to grip of a corresponding lamp 9. The clips 72 and the base portion 71 are integrally formed by injection molding. However, there often causes some problems in application of the above conventional lamp holder. For example, although this integrally-formed lamp holder can simultaneously retain a plurality of lamps, it only can retain a plurality of lamps spaced in a predetermined or fixed interval for a specific LCD type. For other LCD types having different-interval spaced lamps, it is not applicable since the fixed distance between adjacent pairs of clips of this integrally-formed lamp holder is not adjustable arbitrarily. In this case, it would be unavoidable to redesign a new type lamp holder for suiting the other type LCD type, which requires new mold development. Consequentially, this would causes increase of development time and cost.

In addition, if there are manufacture tolerances appearing in the integrally-formed lamp holder to cause the intervals between each adjacent pairs of clips inconsistent that is not adjustable individually, the pairs of clips of this integrally-formed lamp holder can not precisely grip all corresponding lamps.

As described above, the conventional lamp holder is rather inconvenient in assembly. Hence, an improved direct-type backlight module and a lamp holder thereof adequate for assembly of different-intervals spaced lamps are desired.

SUMMARY OF THE INVENTION

To resolve the drawbacks of the prior arts, a primary object of the present invention is to provide a direct-type backlight module and a lamp holder thereof adequate for assembly of different-intervals spaced lamps corresponding to different LCD types, thereby increasing utility and convenience on lamp assembly.

To achieve the above object, the present invention discloses a lamp holder applicable for a backlight module that has a base plate and a plurality of lamps horizontally disposed on the base plate. The lamp holder includes a plurality of connecting arms and a plurality of lamp seats disposed between the base plate and the lamps. Each lamp seat has a retaining portion which defines a cavity at the top thereof for gripping a corresponding lamp, and a pair of engaging hooks formed at the bottom thereof for engaged with a corresponding engaging hole formed on the base plate to fixedly mount the lamp seat on the base plate. Each connecting arm connects with two adjacent lamp seats and has a bendable portion. The connecting arm is bendable by the bendable portion along a horizontal direction to vary a distance between the two adjacent lamp seats, whereby the lamp holder is allowed to freely retain lamps spaced at different intervals.

According to one of the preferred embodiments of the present invention, each connecting arm is made of a flexible material and can be bent into a substantially U-shape, V-shape or S-shape by the bendable portion thereof. The bendable portion of the connecting arm may be in the form of a notch or a pivot, so that the connecting arm can be bent to adjust the distance between the two adjacent lamp seats.

The present lamp holder further includes at least one supporting structure for supporting a diffusion plate of the backlight module. The supporting structure is on the top of the lamp seats, and may have different heights to meet the distance between the base plate and the diffusion plate so as to support the diffusion plate.

According to another aspect of the present invention, a direct-type backlight module is provided, which includes a diffusion plate, a base plate disposed below the diffusion plate, a plurality of paralleled lamps disposed between the diffusion plate and the base plate, and a lamp holder. The lamp holder includes a plurality of lamp seats and a plurality of connecting arms. The lamp seats are disposed between the base plate and the lamps, and each has a retaining portion for gripping a corresponding lamp. Each of the connecting arms connects with two adjacent lamp seats and has a bendable portion. The connecting arm is bendable by the bendable portion in a horizontal direction to vary the distance between the two adjacent lamp seats, whereby the lamp holder is allowed to freely retain lamps spaced at different intervals.

BRIEF DESCRIPTION OF THE DRAWINGS

The present invention may be best understood through the following description with reference to the accompanying drawings, in which.

DETAILED DESCRIPTION OF THE INVENTION

Figure 2:
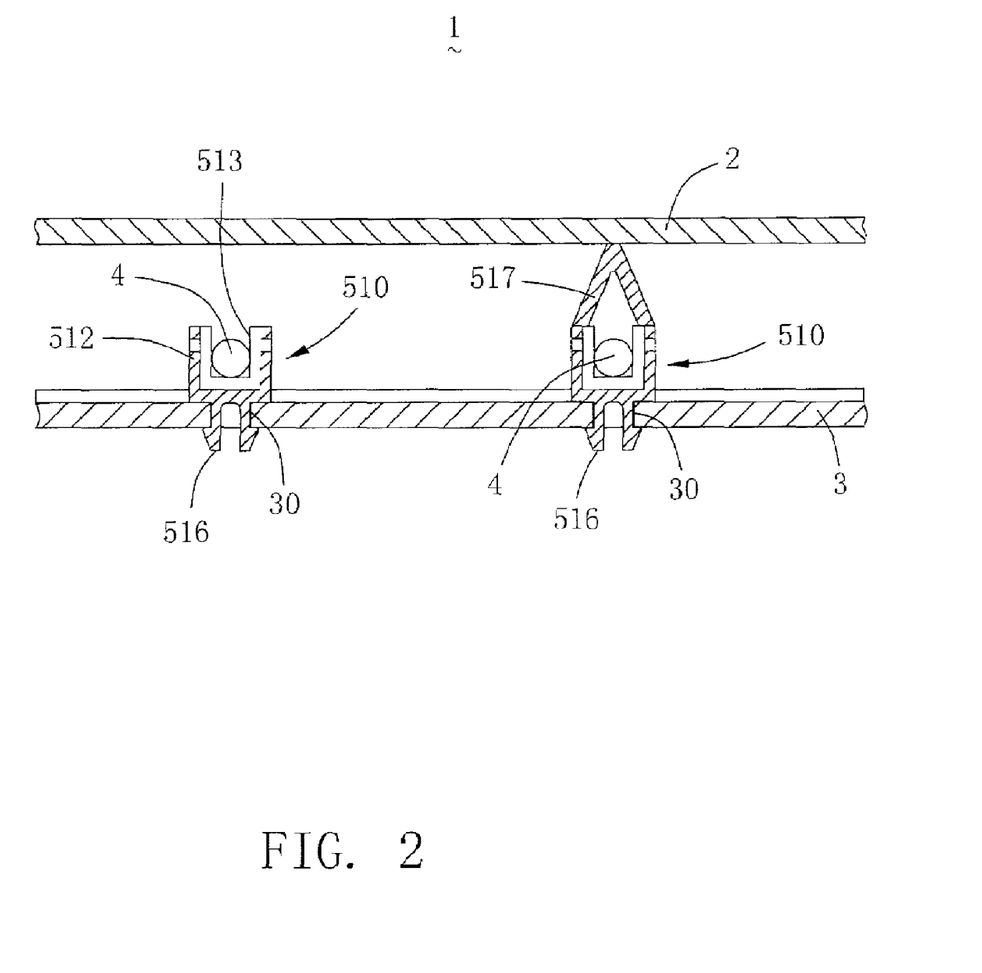
FIG. 2 is a cross-sectional view of a direct-type backlight module in accordance with the present invention.
Figure 3:
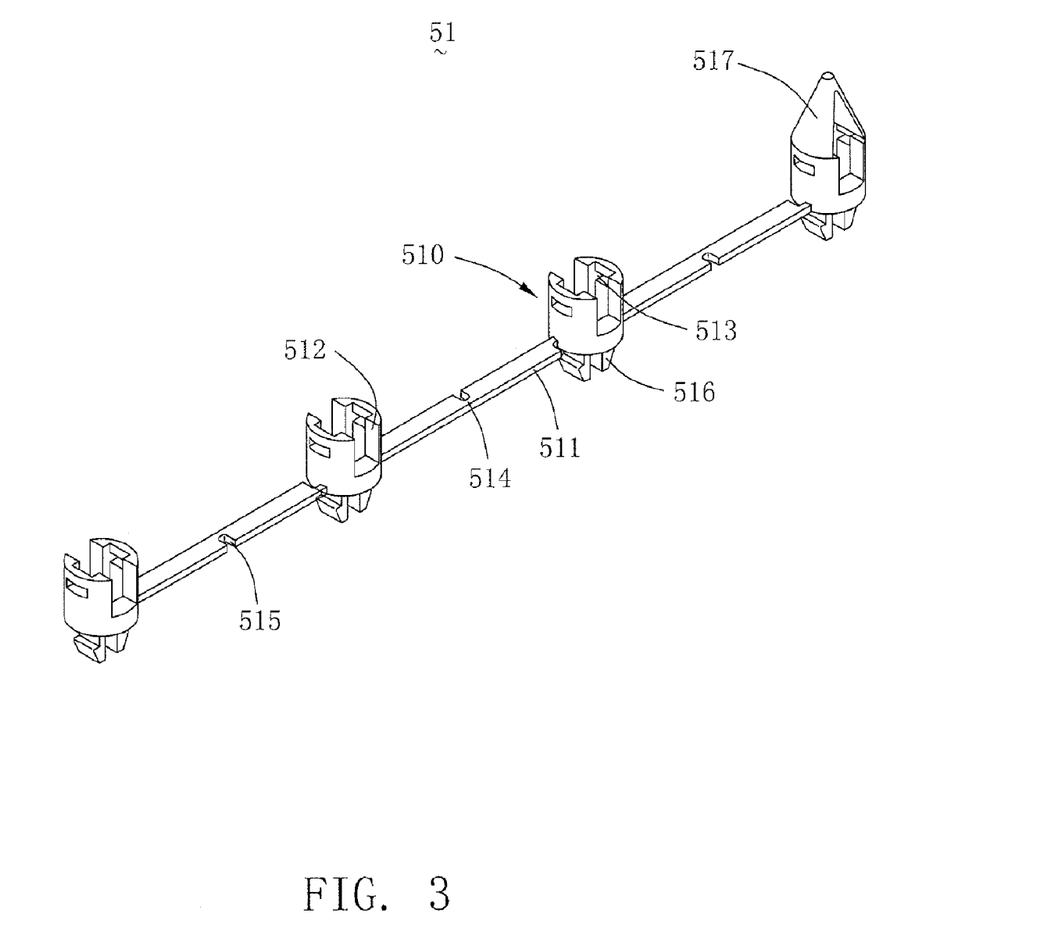
FIGS. 3 and 4 respectively illustrate the configurations of a lamp holder before and after bending in accordance with a first embodiment of the present invention.

Firstly referring to a structural scheme shown in FIG. 3, a lamp holder 51 in accordance with a first embodiment of the present invention mainly includes a plurality of lamp seats 510 and a plurality of connecting arms 511. Each of the lamp seats 510 has a retaining portion 512, and a cavity 513 defined on the respective retaining portion 512, which is realized as having an U-shaped cross section (clearly shown in FIG. 2) for retaining a corresponding lamp 4 therein. A pair of engaging hooks 516 is formed at the bottom of each lamp seat 510. Each of the connecting arms 511 is connected with at least one lamp seat 510, in this embodiment, two adjacent lamp seats 510 at respective opposite ends thereof. A bendable portion 514 is further provided between opposite ends of each connecting arm 511. It should be noted that although the bendable portion 514 is shown in the drawings to be at a middle portion of each connecting arm 511, it is not so limited. The bendable portion 514 may also be disposed at any position of the connecting arm 511 as desired. The connecting arm 511 is made of a flexible material such as plastic, so that it can be resiliently bent. In the first embodiment, the bendable portion 514 is realized as a notch 515 used for strengthening a resiliency of the connecting arm 511 (as detailed later). In alternative case, the connecting arm 511 can be realized as made of a flexible and reflectible material or a transparentible material, and thereby increase the luminance performance of the backlight module in the present invention.

As shown in FIGS. 2 and 3, the lamp holder 51 further has at least one supporting structure 517 which is formed on the top of the corresponding lamp seat 510 to support a diffusion plate 2 of the backlight module 1. For example, to maintain a specific distance between the diffusion plate 2 and a base plate 3 of the backlight module 1, several supporting structures 517 might be individually designed with different heights to conform with the diffusion plates 2.

Figure 4:
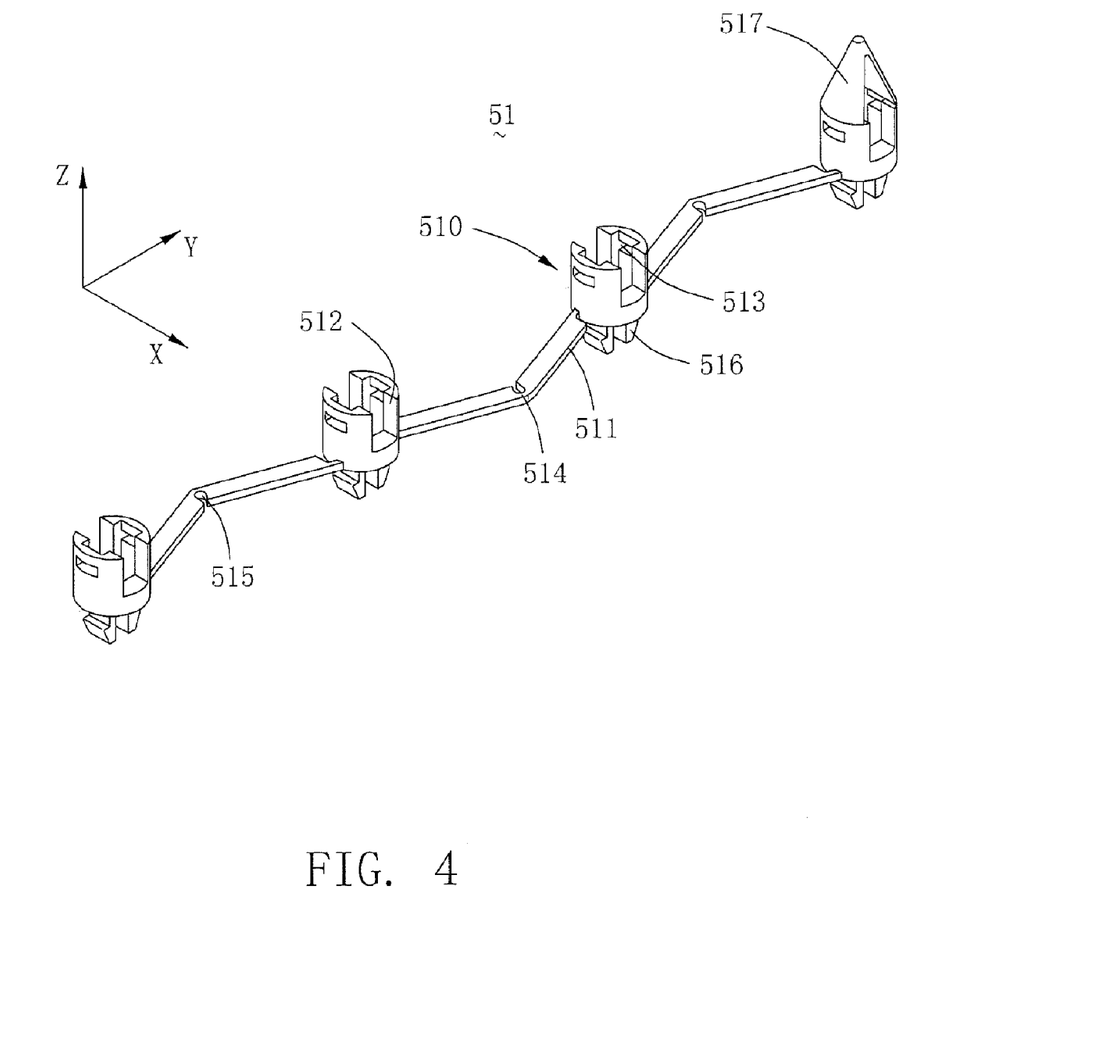

Further referring to FIG. 4, each connecting arm 511 of the lamp holder 51 can be bent by the bendable portion 514 along a horizontal direction, for example, any direction parallel to a XY plane as shown in FIG. 4. This causes the distance adjusted (i.e. reduced) between each two adjacent lamp seats 510 to furnish the lamp holder 51 with a capability of retaining a plurality of lamps 4 spaced at different intervals (see FIG. 5). Because the notch 515 of the connecting arm 511 is capable of strengthening a resiliency of the bendable portion 514, each bendable portion 514 can be bent along a direction parallel to the XY plane into a V-shaped or a reversed V-shaped structure as that shown in FIG. 4.

Figure 5:
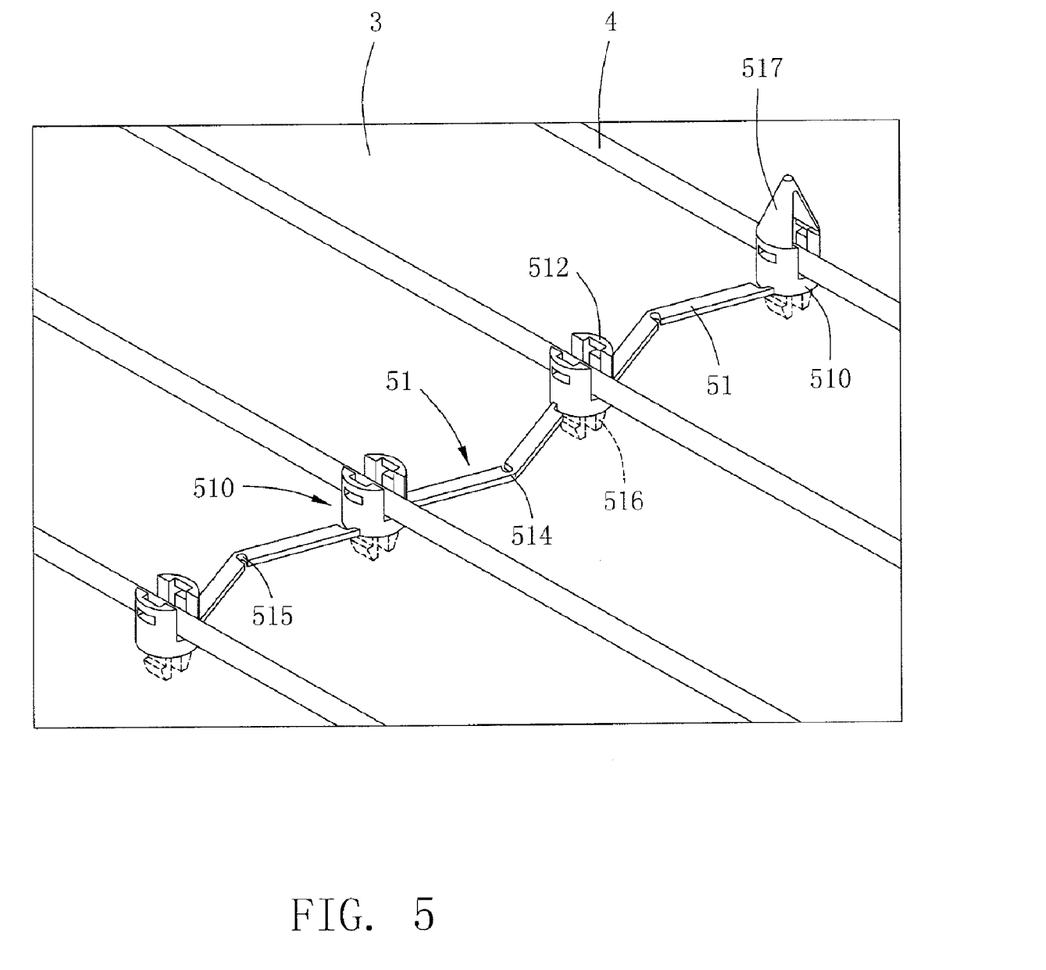
FIG. 5 is a schematic view showing the lamp holder of the first embodiment assembled in the direct-type backlight module.

Returning to FIG. 2 in conjunction with FIG. 5, a direct-type backlight module 1 in accordance with a first embodiment of the present invention is shown. The direct-type backlight module 1 includes a diffusion plate 2, a base plate 3 disposed under the diffusion plate 2, a plurality of paralleled lamps 4 arranged between the diffusion plate 2 and the base plate 3, and a lamp holder 51 as shown in FIG. 3. The light emitted by the lamps 4 is diffused upwardly via the diffusion plate 2 to constitute a plane light source for a liquid crystal panel (not shown). The lamp holder 51 is fixedly mounted onto the base plate 3 by a way that a pair of engaging hooks 516 formed at the bottom of each lamp seat 510 hook a plurality of corresponding engaging holes 30 defined on the base plate 3. In assembly in view of demand, the connecting arm 511 can be bent by the bendable portion 514 thereof to adjust the distance between each two adjacent lamp seats 510 until conforming with the distance between the corresponding engaging holes 30 of the base plate 3. Then, the pair of engaging hooks 516 of each lamp seat 510 can be quickly inserted into and hook onto the corresponding engaging hole 30 of the base plate 3. Next, each lamp 4 is griped by opposite sidewalls of the 'U'-shaped cavity 513 of the retaining portion 512 of the corresponding lamp seat 510. Thus, the lamp 4 can be firmly retained on the base plate 3.

Figure 6:
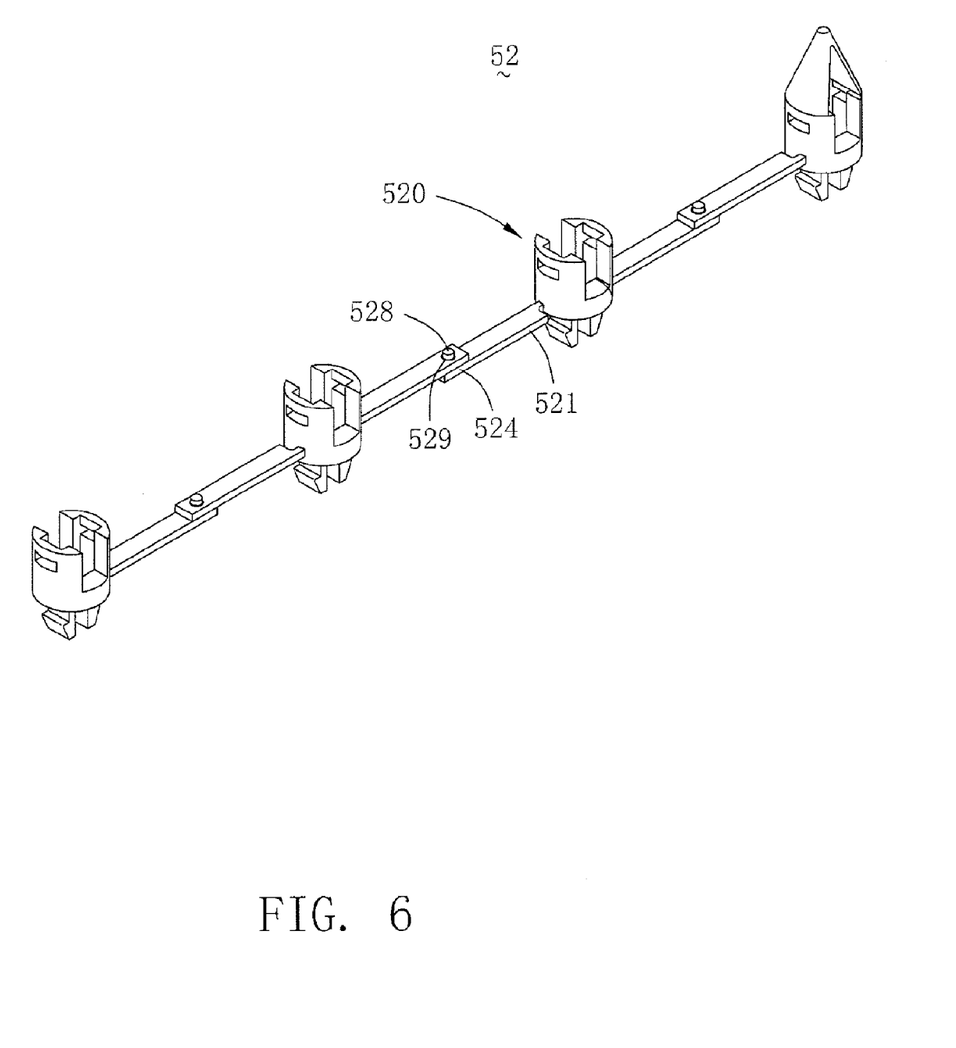
FIGS. 6 and 7 respectively illustrate the configurations of a lamp holder before and after bending in accordance with a second embodiment of the present invention.
Figure 7:
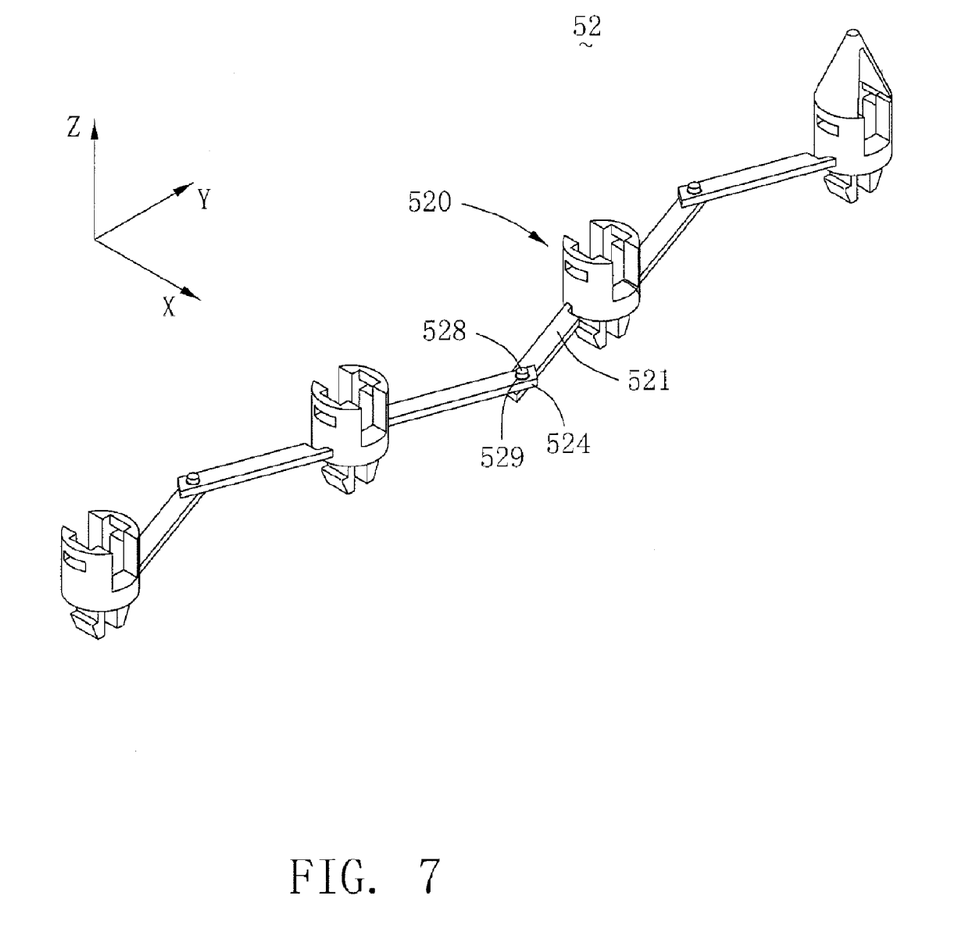

FIGS. 6 and 7 show a lamp holder 52 in accordance with a second embodiment of the present invention. A difference from the first embodiment is that each connecting arm 521 of the second embodiment for connecting two adjacent lamp seats 520 is realized as two elongated portions which are jointed with each other, wherein each elongated portion defines a shaft hole 529 at an joint end thereof. The opposing joint ends of the two elongated portions are jointed with each other by a pivot 528 extending through the shaft holes 529, whereby a bendable portion 524 of each connecting arm 521 of the second embodiment is thus constituted. The bendable portion 524 can be bent along a direction parallel to the XY plane to become a V-shaped or a reversed V-shaped structure as shown in FIG. 7.

Figure 8:
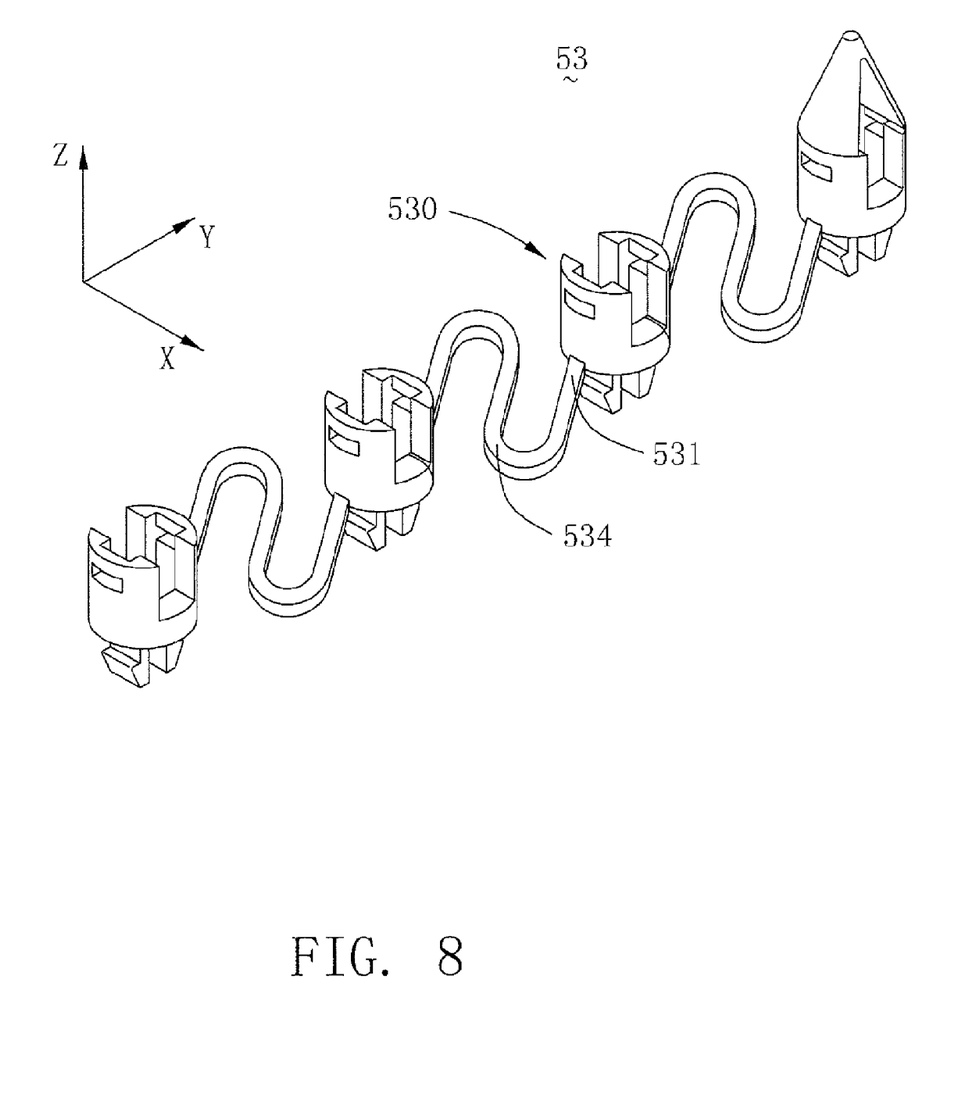
FIG. 8 illustrates the configuration of a lamp holder after bending in accordance with a third embodiment of the present invention.

FIG. 8 illustrates a lamp holder 53 in accordance with a third embodiment of the present invention. A difference from the first and second embodiments is that the bendable portion 534 of each connecting arm 531 of the third embodiment for connecting two adjacent lamp seats 530 is configured into a S-shaped structure and thereby furnishes the connecting arm 531 with a sufficient resiliency along a direction parallel to the XY plane.

As described above, the bendable portions 514, 524, 534 of the respective lamp holders 51, 52, 53 of the present invention can be bent along a direction parallel to the XY plane to constitute a substantial U-shaped, V-shaped or S-shaped structure, but are not limited to the present invention. Various other-shape bendable portions for the lamp holder are also encompassed within the scope of the present invention. Substantially, a bendable portion that is capable of varying length or shape by its flexible property or inherency should be within a scope of the present invention.

In comparison with the prior art, the lamp holders 51, 52, 53 of the present direct-type backlight module 1 includes connecting arms 511, 521, 531 that are bendable along a horizontal direction parallel to the XY plane so as to adjust the distance between adjacent lamp seats 510, 520, 530. Therefore, the lamp holder 51, 52, 53 of the present invention has a capability to retain several lamp groups spaced at different intervals for different LCD types, and thereby increases utility and convenience on the LCD assembly. New mold development for a lamp holder of each different LCD type having differently spaced lamps will be thus no longer required, whereby the development time and cost are saved and the amount of stocked lamp holders are also reduced. In addition, the lamp assembly tolerances also can be compensated by the lamp holder of the present invention. This is accomplished by bending the connecting arm of the present lamp holder to adjust the distance between two corresponding lamp seats. Therefore, by application of the lamp holder of the present invention, the lamp assembly can be greatly facilitated.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A lamp holder for a backlight module, the backlight module having a base plate and a plurality of lamps disposed on the base plate, the lamp holder comprising:
    a plurality of lamp seats disposed above the base plate, each having a retaining portion for gripping a corresponding lamp; and
    a plurality of connecting arms, each connecting with at least one adjacent lamp seat and having a bendable portion which permits the connecting arm bending to move along a horizontal plane of the base plate above which the lamp seats are disposed to vary a distance between adjacent lamp seats and to retain the lamps spaced at different intervals on the lamp holder, wherein the bendable portion defines a notch thereon.

2. The lamp holder as described in claim 1, wherein each connecting arm is made of a flexible material.

3. The lamp holder as described in claim 1, wherein the bendable portion has a substantial U-shape, V-shape or S-shape.

4. The lamp holder as described in claim 1, wherein each connecting arm is made of a high reflecting material or a transparent material.

5. The lamp holder as described in claim 1, wherein the lamp seat has a pair of engaging hooks formed at the bottom thereof, which are engaged with a corresponding engaging hole formed on the base plate to fixedly mount the lamp seat on the base plate.

6. The lamp holder as described in claim 1, further comprising at least one supporting structure for supporting a diffusion plate located within the backlight module.

7. The lamp holder as described in claim 6, wherein the supporting structure is integrally formed on the top of at least one of the lamp seats.

8. The lamp holder as described in claim 7, wherein the supporting structure has different height to conform with a distance between the base plate and the diffusion plate to support the diffusion plate.

9. The lamp holder as described in claim 1, wherein the retaining portion defines a cavity thereon.

10. A direct-type backlight module, comprising:
    a diffusion plate;
    a base plate disposed below the diffusion plate;
    a plurality of lamps disposed between the diffusion plate and the base plate in a parallel relationship; and
    a lamp holder as claimed in claim 1 for retaining the plurality of lamps.

11. A lamp holder for a backlight module, the backlight module having a base plate and a plurality of lamps disposed on the base plate, the lamp holder comprising:
    a plurality of lamp seats disposed above the base plate, each having a retaining portion for gripping a corresponding lamp; and
    a plurality of connecting arms, each connecting with at least one adjacent lamp seat and having a bendable portion which permits the connecting arm bending to move along a horizontal plane of the base plate above which the lamp seats are disposed to vary a distance between adjacent lamp seats and to retain the lamps spaced at different intervals on the lamp holder, wherein the bendable portion has a pivot disposed thereon.

* * * * *